United States Patent [19]

Okuyama

[11] 4,268,086
[45] May 19, 1981

[54] SEAT ASSEMBLY FOR AN AUTOMOBILE
[75] Inventor: Teiji Okuyama, Toyota, Japan
[73] Assignee: Aisin Seiki Kabushiki Kaisha, Kariya, Japan
[21] Appl. No.: 924,838
[22] Filed: Jul. 14, 1978
[30] Foreign Application Priority Data
  Jul. 16, 1977 [JP] Japan .................. 52-85305
[51] Int. Cl.³ .............. A47C 13/00; A47C 1/032
[52] U.S. Cl. ........................ 297/63; 297/317; 297/321; 297/367; 297/379
[58] Field of Search ................ 297/63-66, 297/317, 318, 321, 325, 326, 328, 331, 334, 366-369, 379, 355

[56] References Cited

U.S. PATENT DOCUMENTS

| | | | |
|---|---|---|---|
| 2,859,798 | 11/1958 | Carte | 297/321 |
| 3,079,199 | 2/1963 | Tischler | 297/367 |
| 3,481,646 | 12/1969 | Tabor | 297/367 X |
| 3,806,192 | 4/1974 | Ohlrogge et al. | 297/318 |
| 3,880,464 | 4/1975 | Murphy et al. | 297/379 X |
| 3,973,288 | 8/1976 | Pickles | 297/379 X |
| 4,132,447 | 1/1979 | Tareda | 297/379 X |

FOREIGN PATENT DOCUMENTS

| | | | |
|---|---|---|---|
| 268070 | 6/1964 | Australia | 297/331 |
| 976423 | 11/1964 | United Kingdom . | |
| 1086411 | 10/1967 | United Kingdom . | |

*Primary Examiner*—William E. Lyddane
*Attorney, Agent, or Firm*—Finnegan, Henderson, Farabow, Garrett & Dunner

[57] ABSTRACT

A seat assembly mechanism for inclining a seat back to desired positions including a horizontal position to form a bed and also folded forwardly to provide room for cargo and packages. The seat assembly also has the mechanism for placing the seat back and a seat in an upright position after the seat back has been folded over the seat.

6 Claims, 7 Drawing Figures

SEAT ASSEMBLY FOR AN AUTOMOBILE

The present invention relates to seat assemblies for automobiles and more particularly to foldable seat assemblies for automobiles.

In multi-purpose automobiles, the seats are generally used for accommodating passengers and sometimes for the purpose of beds. Further, the seats may be folded to provide room for cargo or packages.

It is therefore an object of the present invention to provide a seat assembly for automobiles having a seat back which can be inclined to desired positions including horizontal position to form a bed and also folded forwardly to provide a room for cargo and packages.

Another object of the present invention is to provide a mechanism for connecting a seat back with a seat in such a manner that the seat back can be inclined to desired positions and also folded over the seat.

A further object of the present invention is to provide a seat assembly in which the seat and the seat back can together be placed in an upright position after the seat back has been folded over the seat.

According to the present invention, the above and other objects can be accomplished by a seat assembly for an automobile which comprises a seat, a seat back, first bracket means secured to the seat, second bracket means secured to the seat back, counter bracket means having one end pivotably connected with said first bracket means and the other end pivotably connected with the second bracket means, first locking means for releasably locking the counter bracket means on the first bracket means against relative movement, second locking means for releasably locking the counter bracket means on the second bracket means against relative movement, releasing means for releasing the second locking means when the first locking means has been released and said second bracket means has been pivotably moved with respect to the first bracket means in such a direction that the seat back is moved over the seat. The seat back can thus be folded over the seat to provide a room for cargoes and packages.

The first locking means may have a plurality of operative positions so that the counter bracket means may be locked with respect to the first bracket means at a plurality of different orientations. For example, the first locking means may include a plurality of locking recesses and a locking pin movable with the counter bracket means may be engaged with desired one of the locking recesses to lock the counter bracket means on the first bracket means at a desired orientation. In this manner, the seat back can be inclined as desired with respect to a vertical position.

According to a further aspect of the present invention, the seat is swingable about a transverse axis and provided with guide means for guiding a portion of the counter bracket means in such a manner that the point of connection between the first and counter bracket means is lifted when the seat back is moved to a horizontal position so that the seat is also swung to a horizontal position to provide a bed together with the seat back. In this arrangement, the seat may be moved to an upright position together with the seat back after the seat back has been folded over the seat by swingably moving the seat about the transverse axis in order to provide room in the automobile. Third locking means may be provided for releasably locking the counter bracket means to an automobile body so that the seat may be locked in a usable position in which a passenger or passengers can sit on the seat.

The above and other objects and features of the present invention will become apparent from the following descriptions of a preferred embodiment taking reference to the accompanying drawings, in which;

FIG. 6 is a perspective view showing the inward side of the tilting mechanism.

FIG. 7 is a side view of the locking mechanism used in the seat assembly.

Figure 1:
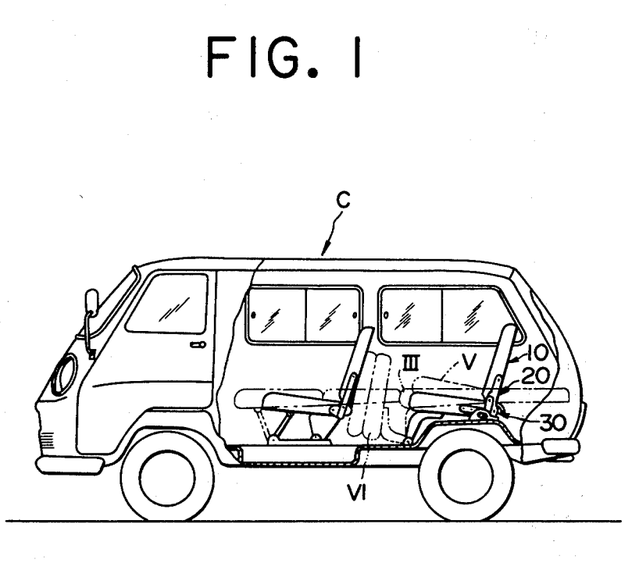
FIG. 1 is a partially broken away side view of an automobile equipped with a seat assembly in accordance with one embodiment of the present invention.
Figure 2:
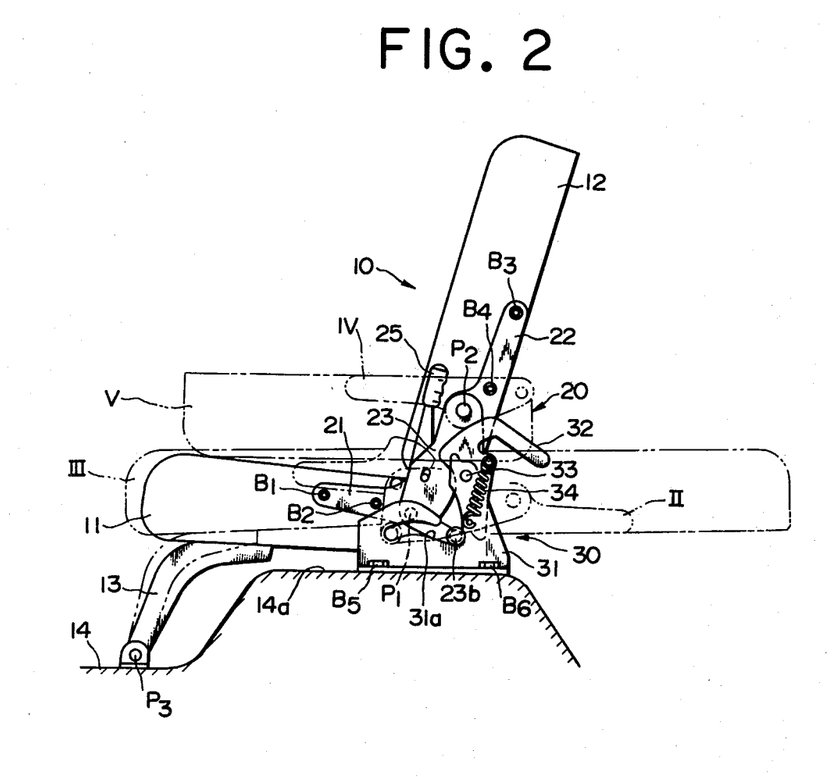
FIG. 2 is a side view of the seat assembly in accordance with one embodiment of the present invention.

Referring to the drawings, particularly to FIG. 1, the automobile C shown therein has a seat assembly 10 in accordance with one embodiment of the present invention. As shown in FIG. 2, the seat assembly 10 includes a seat 11 and a seat back 12 which are connected together by means of a pair of seat back tilting mechanisms 20, which are provided one at each side of the seat and only one of which is shown in the drawing. At the forward end, the seat 11 has legs 13 which are attached to the floor 14 of an automobile body through transversely extending pivot pins $p_3$ so that the seat 11 is pivotable or swingable about common axis of the pins $p_3$. The seat 11 is secured or locked to a raised portion 14a of the floor 14 at the rear end portion through a pair of locking devices 30 which are provided one on each side of the seat.

Referring specifically to FIGS. 2 through 6A, the tilting mechanism 20 is composed of a first bracket 21 secured through bolts $B_1$ and $B_2$ to each side of the seat 11, a second bracket 22 secured through bolts $B_3$ and $B_4$ to each side of the seat back 12, and a counter bracket 23 having one end pivotably connected through a pivot pin $p_1$ with the first bracket 21 and the other end pivotably connected through a pivot pin $p_2$ with a second bracket 22. The counter bracket 23 is releasably locked to the first bracket 21 through a first locking device which is essentially composed of a first locking pin 24 and an actuating lever 25. The second bracket 22 is releasably locked to the counter bracket 23 through a second locking device which is essentially composed of a second locking pin 22a and a latch member 26.

Figures 3, 4:
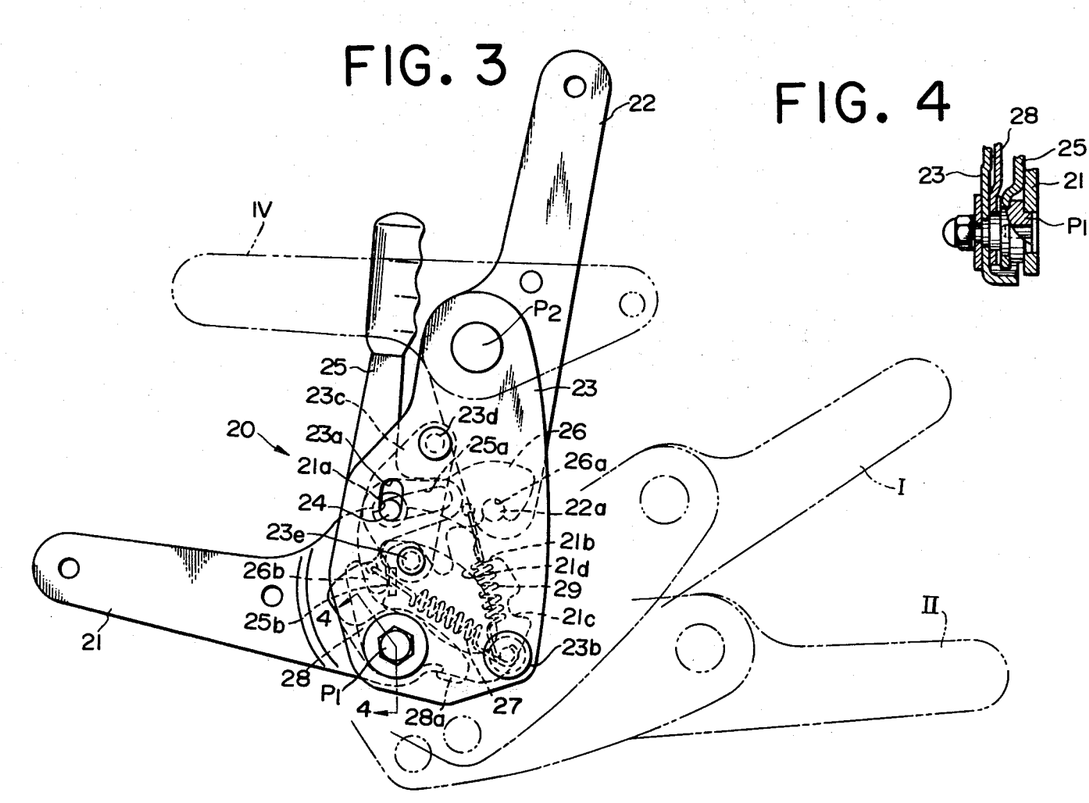
FIG. 3 is an enlarged view of the seat back tilting mechanism used in the seat assembly shown in FIG. 2.
FIG. 4 is a sectional view taken substantially along the line 4—4 in FIG. 3.
Figure 6A:
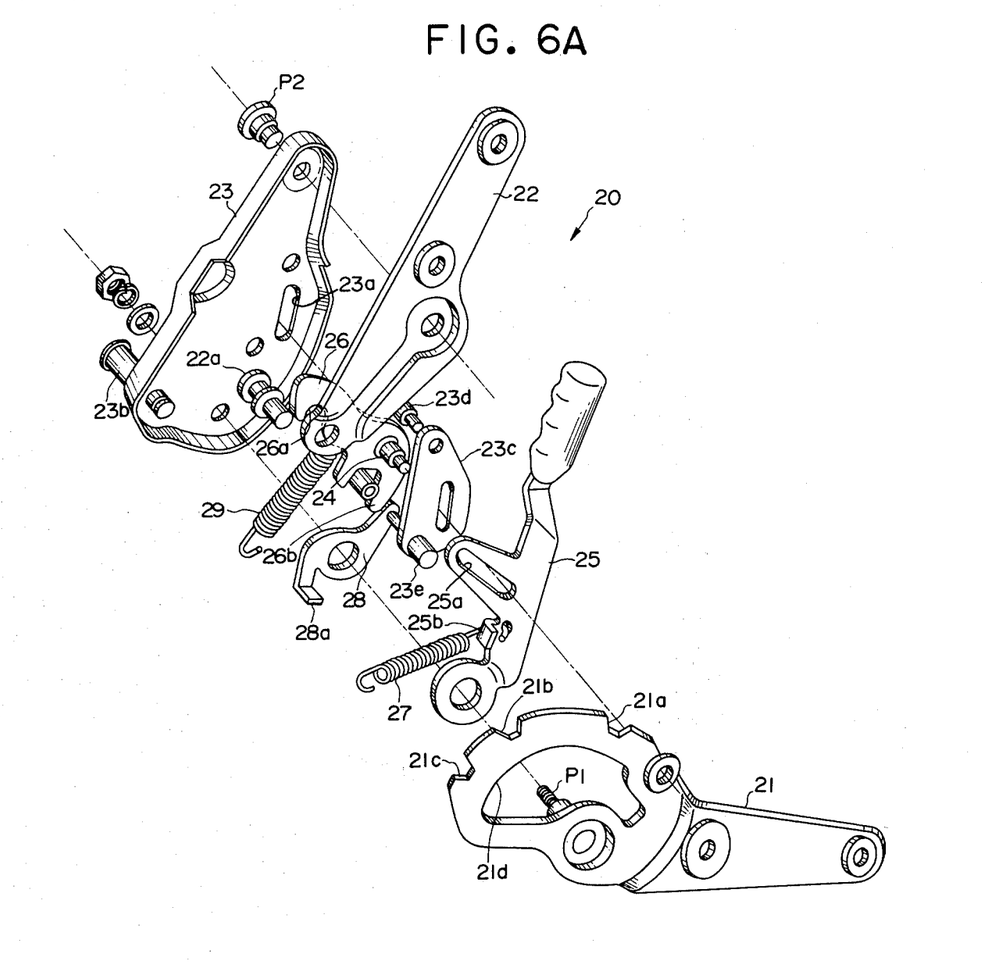
FIG. 6A is an exploded view of FIG. 6.

The first bracket 21 carries the aforementioned pivot pin $p_1$ which is welded thereto at the lower aft portion thereof as shown in FIGS. 4 and 6A. Further, as clearly shown in FIG. 6A, the first bracket 21 is formed at the upper rearward edge portion with a forward locking recess 21a, an intermediate locking recess 21b, a rearward locking recess 21c and the first bracket 21 is further formed with an aperture 21d.

The counter bracket 23, as seen in FIG. 6A, has an elongated slot 23a which is adapted to receive the aforementioned first locking pin 24. A bearing pin 23b is provided on the counter bracket 23 at the lower rearward portion thereof so as to engage with the locking device 30 which is provided on the raised portion 14a as shown in FIG. 2. To the counter bracket 23, there is secured a reinforcement plate 23c which is attached to the bracket 23 by means of pins 23d and 23e. The plate 23c has a slot which is aligned with the slot 23a in the bracket 23. The lower pin 23e projects into the aperture 21d in the first bracket 21 so that the rotation of the counter bracket 23 is limited by the engagement between the pin 23e and the first bracket 21.

The first locking pin 24 is provided on the latch member 26. The actuating lever 25 has a cam slot 25a extending substantially transversely of the lever and the first locking pin 24 is inserted into the slots 23a and 25a so that the pin 24 and the latch member 26 is moved upon actuation of the lever 25. The first locking pin 24 is adapted to engage one of the locking recesses 21a, 21b and 21c so as to lock the counter bracket 23 to the first bracket 21. By moving the pin 24 from one of the recesses 21a, 21b and 21c to another, the angle between the brackets 21 and 23 can be changed. Thus, the inclination of the seat back can be changed.

The actuating lever 25 is pivotably mounted on the first bracket 21 by the pivot pin $P_1$ and biased in clockwise direction as viewed in FIG. 3 by means of a coil spring 27 which acts between the lever 25 and the pin 23b. Thus, the lever 25 is forced in a direction wherein the pin 24 is brought into engagement with either one of the recesses 21a, 21b and 21c. As shown in FIGS. 6 and 6A, the lever 25 has a lug 25b which is formed thereon at a portion corresponding to the aperture 21d in the first bracket 21 by bending a portion of the lever 25 toward the bracket 21.

Figure 5:
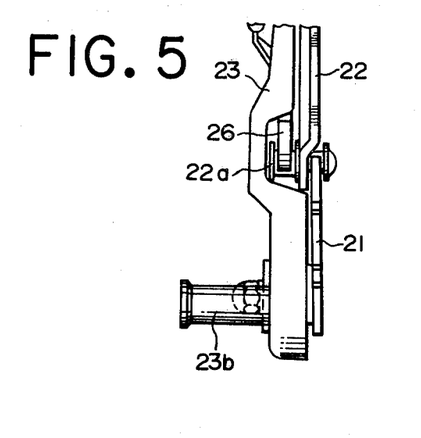
FIG. 5 is a fragmentary rear view of the tilting mechanism shown in FIG. 3.

The latch member 26 is disposed as shown in FIGS. 5 and 6A between the brackets 22 and 23 and formed with a locking recess 26a adapted to engage with a second locking pin 22a on the second bracket 22. The latch member 26 further has an arm 26b which is provided for engagement with a releasing lever 28. The latch member 26 is biased in clockwise direction as viewed in FIG. 3 by means of a coil spring 29 which acts between the latch member 26 and the pin 23b so that the latch member 26 is forced in a direction wherein the recess 26a is engaged with the second locking pin 22a.

The releasing lever 28 is disposed between the counter bracket 23 and the actuating lever 25 as shown in FIG. 4 and carried on the pivot pin $P_1$. The lever 28 is formed at the lower end with a stop lug 28a which is adapted to engage the lower edge of the first bracket 21 so as to restrict counterclockwise rotation of the lever 28 as seen in FIGS. 3 and 6. The releasing lever 28 serves, when the arm 26b of the latch member 26 is moved into engagement with the lever 28, to apply the latch member 26 with a force which acts to rotate the latch member 26 counterclockwise as viewed in FIG. 3 about the first locking pin 24 so as to disengage the recess 26a of the latch member 26 from the second locking pin 22a.

Figure 7A:
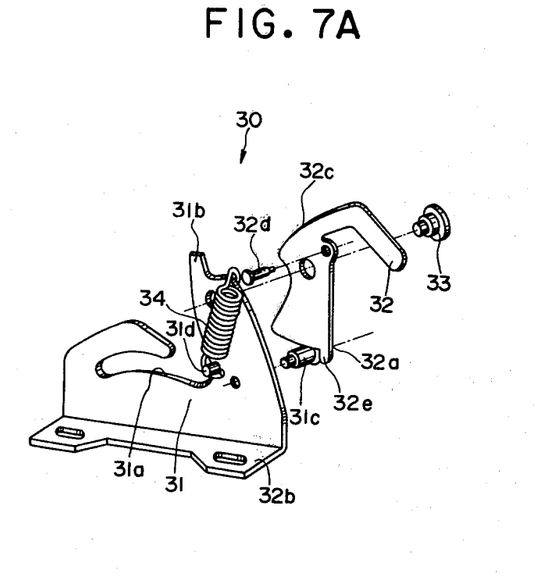
FIG. 7A is an exploded view of FIG. 7.

The locking device 30 serves to lock the seat 11 against the swinging movement about the pin $P_3$ and comprises as shown in FIGS. 2, 7 and 7A a base 31 secured by means of bolts $B_5$ and $B_6$ to the raised portion 14a of the body floor, a locking lever 32 pivotably connected to the base 31 by means of a pin 33, and a spring 34 which acts between the base 31 and the locking lever 32. The base 31 is formed with a cam slot 31a which has an open rear end.

The locking lever 32 has a stop edge 32a which serves to close the open end of the cam slot 31a when it is in an operative position as shown by solid lines in FIG. 7. Continuing with the stop edge 32a, there is formed a guide slope 32b which is adapted to engage with the bearing pin 23b when the pin 23b is moved downwardly so that the locking lever 32 is rotated counterclockwise by the pin 23b so as to allow the pin to enter the cam slot 31a. Above the guide slope 32b, there is formed an abutting edge 32c which is adapted to engage with the bearing pin 23b as the pin 23b moves downwardly when the locking lever 32 is in the position as shown by phantom lines in FIG. 7 so that the lever 32 is forced clockwise by the downwardly moving pin 23b.

The spring 34 has one end engaged with a pin 31d provided on the base 31 and the other end engaged with a pin 32d provided on the locking lever 32. The pins 31d and 32d are so located that the spring 34 biases the lever 32 clockwise as seen in FIG. 7 when the line passing through the pins 31d and 32d is at the right side with respect to the pin 33 but biases the lever 32 counterclockwise when said line is at the left side of the pin 33. The locking lever 32 has a projection 32e which is adapted to engage with a stop pin 31c provided on the base 31 so as to limit the clockwise rotation of the lever 32. The base 31 has an upward projection 31b which is adapted to engage with the pin 32d so as to limit the counterclockwise rotation of the lever 32.

As shown in FIG. 6, a connecting mechanism 40 may be provided to connect the actuating lever 25 at the opposite sides of the seat 11. The connecting mechanism 40 is composed of a connecting rod 41 and a pair of arms 42, only one of the arms 42 being shown in FIG. 6. The connecting rod 41 is supported at its opposite ends coaxially with and rotatably about the axis of the pivot pin $p_1$. Each of the arms 42 has a slit 42a through which the arm 42 engages with the lug 25b on the adjacent actuating lever 25. Thus, the movement of one of the actuating levers 25 causes the connecting rod 41 to rotate about its axis and thus the other actuating lever 25 is simultaneously moved in the same way.

In the arrangement described above, the first locking pin 24 is in engagement with the forward locking recess 21a in the first bracket 21 under a normal position and the second locking pin 22a is in engagement with the recess 26a of the latch member 26. Thus, the counter bracket 23 is locked to both the first and second brackets 21 and 22 and the tilting mechanism is maintained at the position shown by solid lines in FIGS. 2 and 3. In this instance, the locking device 30 is also in the position shown by solid lines in FIG. 2 so that the bearing pin 23b is held at the rear end of the cam slot 31a whereby the seat 11 and the seat back 12 are locked in the positions shown by solid lines in FIG. 2.

When it is desired to incline the seat back 12 rearwardly, the actuating lever 25 is simply pushed forwardly. Then, the first locking pin 24 is moved under the action of the cam slot 25a out of engagement with the recess 21a of the first bracket 21 so that it becomes possible to incline the seat back 12 rearwardly. As the seat back 12 is inclined rearwardly, the second bracket 22 and the counter bracket 23 are inclined as a unit rearwardly with respect to the first bracket 21. In this instance, the first locking pin 24 is also moved rearwardly with the brackets 22 and 23. The actuating lever 25 may then be returned to the original position when the first locking pin 24 has come to a position corresponding, for example, to the intermediate locking recess 21b whereby the pin 24 is brought into engagement with the recess 21b so as to lock the counter bracket 23 to the first bracket 21. Thus, the seat back 12 is locked at an inclined position as shown by phantom lines I in FIG. 3.

When the second bracket 22 is further moved rearwardly with the actuating lever 25 moved forwardly and the actuating lever 25 is returned rearwardly after the first locking pin 24 has come to a position corresponding to the rear recess 21c in the first bracket 21, the pin 24 is engaged with the rear locking recess 21c to lock the counter bracket 23 to the first bracket 21 with the seat back 12 maintained in a horizontal position as shown by phantom line II in FIGS. 2 and 3. As the seat back 12 is thus moved or inclined rearwardly, the bearing pin 23b is moved forwardly in the guide cam slot 31a so that the first bracket 21 is forced in forward and upward direction. Thus, the seat 11 is slightly moved forwardly about the pivot pin $p_3$ to a position horizontal with respect to the floor 14 as shown by phantom lines III in FIGS. 1 and 2. It will thus be noted that the seat 11 and the seat back 12 are maintained at the horizontal positions in the same level to provide a bed as shown by phantom lines in FIGS. 1 and 2.

It will of course be understood that the seat back 12 may be returned to the original position through a procedure which is reverse to the above procedure.

When it is desired to move the seat 11 forward upright position, the actuating lever 25 is at first moved forwardly to disengage the first locking pin 24 from the forward recess 21a in the first bracket 21 and the seat back 12 is forced forwardly. The arm 26b on the latch member 26 then abuts the releasing lever 28 so that the latch member 26 is rotated counterclockwise with the result that the second locking pin 22a is moved out of engagement with the recess 26a in the latch member 26 to allow the second bracket 22 to move about the pivot pin $P_2$. Thus, the second bracket 22 is moved to the forwardly folded position as shown by phantom lines IV in FIGS. 2 and 3. The seat back 12 is thus folded over the seat 11 as shown by phantom lines V in FIGS. 1 and 2.

Thereafter, the lock lever 32 of the locking device 30 is swung counterclockwise as viewed in FIG. 7 so as to open the rear end of the cam slot 31a and the seat 11 is rotated forwardly about the pivot pin $P_3$ to the forward upright position shown by phantom lines VI in FIG. 1. As the seat 11 is thus rotated forwardly, the bearing pin 23b engages the abutting edge 32c and forces the lock lever 32 clockwise so that it is returned to the locking position.

In returning the seat assembly 10 to the original position, the seat 11 is moved rearwardly about the pivot pin $P_3$ until the bearing pin 23b is moved along the guide edge 32b on the lock lever 32 into engagement with the cam slot 31a. Then, the seat back 12 is rotated rearwardly about the pin $P_2$ until the second locking pin 22a engages with the recess 26a in the latch member 26 to lock the seat back 12 at the position shown by solid lines. It should be noted that the locking lever 32 of the locking device 30 has in advance been returned to the locking position as previously described by being forced clockwise by the bearing pin 23b when the latter is moved out of the cam slot 31a. However, even when the locking lever has failed to return to the locking position when the bearing pin 23b is moved out of the cam slot 31a, the locking lever 32 will be moved to the locking position by the downwardly moving bearing pin 23b when the seat 11 is being returned to the original position because the bearing pin 23b will come into engagement with the abutting edge 32c on the locking lever 32 and force it clockwise.

The invention has thus been shown and described with reference to a specific embodiment, however, it should be noted that the invention is in no way limited to the details of the illustrated arrangement but changes and modifications may be made without departing from the scope of the appended claims.

I claim:

1. A seat assembly for an automobile providing means for rearward adjustment to a plurality of inclined positions including horizontal and means for forwardly folding the seat assembly, the seat assembly comprising:
   (a) a seat swingable about a transverse axis;
   (b) a seat back;
   (c) first bracket means, including a plurality of locking recesses, secured to said seat;
   (d) second bracket means secured to said seat back;
   (e) counter bracket means;
   (f) releasing means;
   (g) actuating lever means;
   (h) a first pivot pin pivotally connecting one end of said counter bracket means to said first bracket means, said first pivot pin passing through openings in said releasing means and said actuating lever means;
   (i) a second pivot pin pivotally connecting the other end of said counter bracket means to said second bracket means;
   (j) first locking means for releasably locking said counter bracket means to said first bracket means preventing movement relative to each other comprising:
      (1) a latch means disposed between said counter bracket means and said second bracket means; and
      (2) a first locking pin secured to said latch means and received in a slot in said counter bracket means and adapted to selectively engage the plurality of locking recesses in said first bracket means;
   (k) second locking means for releasably locking said counter bracket means to said second bracket means preventing movement relative to each other, comprising:
      (1) a second locking pin secured to said counter bracket means and adapted to engage a locking recess in said latch means; and
      (2) means for biasing said latch means in a direction for engaging said second locking pin with said locking recess, said second locking means being released by said releasing means when said first locking means has been released and when said second bracket means has been pivotally moved with respect to said first bracket means in a direction to place the seat back over the seat; and
   (l) guide means for guiding a portion of said counter bracket means in such a manner that the point of connection between said first bracket means and counter bracket means is moved when said seat back is moved to a horizontal position so that said seat is moved to a horizontal position to provide a bed together with said seat back.

2. The seat assembly as in claim 1 in which said actuating lever means includes an actuating lever, and also including means for biasing said actuating lever in a direction for engaging said first locking pin in one of the recesses of said first bracket means, and including a releasing lever secured to said releasing means, said releasing lever being disposed between said counter bracket and said actuating lever, and wherein said latch means has an arm provided for engagement with said releasing means.

3. Seat assembly in accordance with claim 1 in which said seat is movable about said transverse axis to an upright position after the seat back has been moved over the seat.

4. Seat assembly in accordance with claim 1 which further includes third locking means for releasably locking the seat to an automobile body at a usable position in which a passenger can sit on the seat.

5. Seat assembly in accordance with claim 4 in which said third locking means includes locking lever means provided on the automobile body and movable between a locking and unlock positions, and pin means provided on the counter bracket means and adapted to engage with the locking lever means.

6. Seat assembly in accordance with claim 5 in which means is provided for forcing the locking lever means to the locking position when the pin means has been released from the locking engagement with the locking lever means.

* * * * *